(12) United States Patent
Asano et al.

(10) Patent No.: US 6,925,227 B2
(45) Date of Patent: Aug. 2, 2005

(54) OPTICAL DEVICE (75) Inventors: Kenichiro Asano, Sakura (JP); Norihiro Momotsu, Sakura (JP); Kenji Nishiwaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 2 days.

(21) Appl. No.: 10/644,831

(22) Filed: Aug. 21, 2003

(65) Prior Publication Data

US 2004/0042720 A1 Mar. 4, 2004

(30) Foreign Application Priority Data

Aug. 30, 2002 (JP) ........................................ 2002-256160
Aug. 30, 2002 (JP) ........................................ 2002-256161

(51) Int. Cl.$^7$ ................................................. G02B 6/32
(52) U.S. Cl. ............................ 385/34; 385/24; 385/32; 385/74; 385/47
(58) Field of Search ........................ 385/32–34, 24, 385/47, 52, 73, 74, 131

(56) References Cited

U.S. PATENT DOCUMENTS

| | | | | |
|---|---|---|---|---|
| 5,799,121 A | * | 8/1998 | Duck et al. | 385/47 |
| 6,347,170 B1 | * | 2/2002 | Zheng | 385/34 |
| 6,782,162 B2 | * | 8/2004 | Fukuzawa et al. | 385/34 |
| 2002/0081067 A1 | * | 6/2002 | Brun et al. | 385/34 |

* cited by examiner

*Primary Examiner*—Fayez G. Assaf
(74) *Attorney, Agent, or Firm*—Sughrue Mion, PLLC (57) ABSTRACT

An optical device comprises a first refractive index distribution (RID) type lens, having one end face ground diagonally, first and second ports connected to the diagonally ground end face, an optical functional element connected to another end face of the first RID type lens, a second RID type lens, having one end face ground diagonally, and another end face placed so as to face the end face of the first RID type lens through the optical functional element, and a third port connected to the diagonally ground end face. An optical path from the first port reflected by the optical functional element to the second port, wherein the optical path length of the reflected light through the first RID type lens is equal to an optical path length of transmitted light from the first port through the optical functional element through the second RID type lens to the third port.

11 Claims, 4 Drawing Sheets

($\lambda_1 > \lambda_2$)

OPTICAL DEVICE

Priority is claimed under 35 U.S.C. § 119 to Japanese patent application nos. 2002-256160 filed Aug. 30, 2002 and 2002-256161 filed Aug. 30, 2002, both of which are incorporated herein by reference.

TECHNICAL FIELD

The present invention relates to optical devices in which optical functional elements formed from multilayer dielectrics or the like are placed between two refractive index distribution type lenses, and, in particular, relates to optical multiplexer/demultiplexer component, formed from multilayer dielectrics or the like are placed between two refractive index distribution type lenses, and used in the fields of optical communication and optical instrumentation.

BACKGROUND ART

Hereinafter, background arts of two aspects of the present invention will be described.

In the first aspect of the present invention, an improved structure of an optical multiplexer/demultiplexer filter is described, among optical devices having optical functional elements formed from multilayer dielectrics or the like. The optical multiplexer/demultiplexer comprises an optical branching filter or the like is inserted between the end faces of two collimator lenses, and also input and output ports formed from optical fibers are placed on the other end faces of the collimator lenses.

Figure 10:
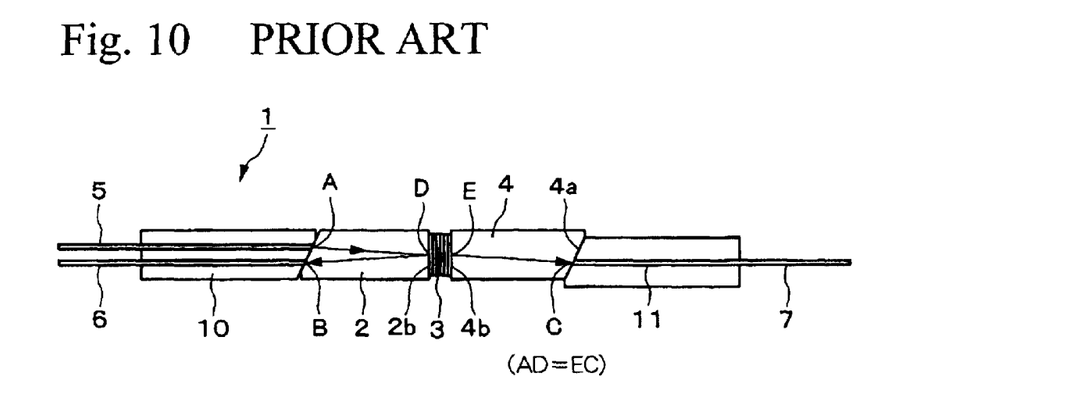
FIG. 10 is a schematic block diagram showing an example of a conventional optical functional component.

FIG. 10 shows an example of an optical functional component disclosed in U.S. Pat. No. 6,347,170. An optical functional component 1 in the figure is a WDM (wavelength division multiplexed) type optical multiplexer/demultiplexer, and has a WDM optical multiplexer/demultiplexer filter 3 as the optical functional component. First and second refractive index distribution type lenses 2 and 4 serving as collimating lenses are placed on the two sides of this optical multiplexer/demultiplexer filter 3. The refractive index distribution type lens (also called a GRIN lens) is a substantially cylindrical lens having a radial refractive index, which reduces from the lens optical axis towards the outer periphery.

A first port 5 for input and a second port 6 for output, which are formed from optical fibers, are connected to the end face 2a of the first refractive index distribution type lens 2 on the opposite side from the optical multiplexer/demultiplexer filter 3. Similarly, a third port 7 formed from an optical fiber is connected to the end face of the second collimator lens 4 on the opposite side from the optical multiplexer/demultiplexer filter 3.

The end faces of the respective ports 5, 6 and 7, and the end faces 2a and 4a of the refractive index distribution type lenses 2 and 4, facing the respective ports 5, 6 and 7, are ground and polished so as to be tilted with a predetermined angle (in general within a range from 6 to 8 degrees) to the optical axis, in order to prevent light reflected by the end faces from entering the optical path. As a result, the reflected light is diverted away from the optical axis.

The optical multiplexer/demultiplexer 1 functions as below. At first, when wavelength division multiplexed signal light is input from the first port 5, this light is converged by the first refractive index distribution type lens 2 and input to the optical multiplexer/demultiplexer filter 3. The optical multiplexer/demultiplexer filter 3 passes only light of a certain wavelength, of the wavelength division multiplexed signal light, and reflects the light of other wavelengths. Therefore, the light which can pass through the optical multiplexer/demultiplexer filter 3, after passing therethrough, is output to the third port 7 via the second refractive index distribution type lens 4. Moreover, the light reflected in the optical multiplexer/demultiplexer filter 3, after reflecting therein is output to the second port 6 via the first refractive index distribution type lens 2. In this manner, the incident light incident from the first port 5 can be branched into two outputs which are output from the second and third ports 6 and 7.

With this, in conventional optical function goods as mentioned above, in order to reduce manufacturing cost, refractive index distribution type lenses with the same length and similar specifications are used for the refractive index distribution type lenses 2 and 4. However, since the end faces 2a and 4a thereof are ground diagonally, the optical path length (optical path length AD+DB in FIG. 4) in the lens from the first port 5 to the second port 6 after reflection by the optical multiplexer/demultiplexer filter 3 is not the same as the optical path length (optical path length AD+EC in FIG. 4) in the lens from the first port 5 to the third port 7 after transmission through the optical multiplexer/demultiplexer filter 3. In FIG. 10, points A to E indicate positions where the optical signals are input to or output from the end faces of the refractive index distribution type lenses 2 and 4.

Therefore, since both the output light from point B to the second port 6, and the output light from point C to the third port 7 cannot have the same focal length, the coupling efficiency to the ports 6 and 7 is reduced causing an increase in losses. In particular recently this is a problem with optical multiplexer/demultiplexers for high density wavelength division multiplexed communication systems which are being introduced corresponding to the increase in communication capability.

Heretofore, in order to resolve this problem, the lengths of the refractive index distribution type lenses 2 and 4 are made shorter than the focal distances of the lenses (0.25 pitch), and the end faces of the ports 5, 6, and 7 and the end faces of the respective facing refractive index distribution type lenses 2 and 4 are separated, and the positional relation of these is adjusted (aligned) so that the losses can be reduced as much as possible, and these are then secured using an adhesive.

However, in this method, since alignment with the lens optical axis direction is necessary, alignment of the ports 5, 6 and 7 is difficult and thus takes time. Moreover, since the distance between the ports 5, 6 and 7 and the end faces of the refractive index distribution type lenses 2 and 4 is increased, then in the case of a structure where adhesive is filled between the end faces, there remains the problem that the performance of the optical functional component is susceptible to the influence of volumetric changes due to the mechanical strength and temperature changes of the adhesive, so that the stability of the optical characteristics is deteriorated.

In the second aspect of the present invention, an improved optical multiplexer/demultiplexer components is described, which comprises an optical multiplexer/demultiplexer filter, an optical branching filter or the like is inserted between the end faces of two collimator lenses, and also input and output ports formed from optical fibers are placed on the other end faces of the collimator lenses.

Figure 11:
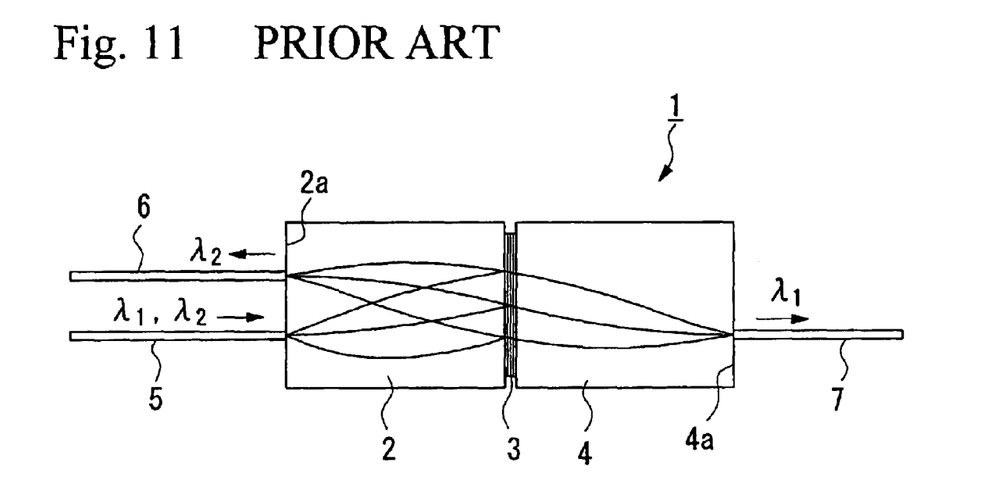
FIG. 11 is a schematic block diagram showing an example of a conventional optical multiplexer/demultiplexer.

FIG. 11 shows a conventional example schematic structure of an optical multiplexer/demultiplexer (for example, refer to U.S. Pat. No. 6,347,170).

An optical multiplexer/demultiplexer 1 in the figure is provided with an optical multiplexer/demultiplexer element 3 formed from a multilayer dielectric, and first and second collimator lenses 2 and 4 placed on the two sides of this optical multiplexer/demultiplexer element 3. First and second refractive index distribution type lenses 2 and 4 serving as collimator lenses are placed on the two sides of this optical multiplexer/demultiplexer filter 3.

A first port 5 and a second port 6, which are formed from optical fibers, are connected to the end face 2a of the first collimator lens 2 on the opposite side from the optical multiplexer/demultiplexer element 3. Furthermore, a third port 7 formed from an optical fiber is connected to the end face of the second collimator lens 4 on the opposite side from the optical multiplexer/demultiplexer element 3.

In this optical multiplexer/demultiplexer 1, refractive index distribution type lenses with a pitch of approximately 0.25 are used for the first and second collimator lenses 2 and 4. Here, a length of one pitch in a refractive index distribution type lens represents a sinusoidal cycle of a light beam traveling in the refractive index distribution type lens.

Accordingly, the optical path length in the lens from the first port to the second port after reflection by the optical multiplexer/demultiplexer element 3, and the optical path length (not including the optical path length transmitting through space and the optical multiplexer/demultiplexer element 3) in the lens from the first port to the third port after passing through the optical multiplexer/demultiplexer element 3, are both 0.5 pitch. Therefore, light diverged and entered from the first port converges on the end face of the lens, so if the locations of each of the ports 5 through 7 are selected appropriately, it is possible to connect the collimator lenses 2 and 4 and the ports 5 through 7 with high efficiency.

Incidentally, however, in recent years, there has been a strong requirement to expand communication capacity, and hence the wavelength regions used for communication have been expanded, which constitutes problems of the second aspect. Because of wavelength dispersion in the collimator lenses 2 and 4, the differences in focal lengths between wavelengths of optical signals with large differences in wavelength cannot be ignored. This causes outgoing lights from the collimator lenses 2 and 4 to converge at locations deviating from the end faces of the ports 5 through 7, and hence there is a problem of increasing losses.

DISCLOSURE OF THE INVENTION

In order to solve the above problem, the first aspect of the present invention provides an optical functional component comprising: a first refractive index distribution type lens, one end face of which is ground diagonally, first and second ports connected to the diagonally ground end face of the first refractive index distribution type lens, an optical functional element connected to an other end face of the first refractive index distribution type lens, a second refractive index distribution type lens, one end face of which is ground diagonally, and another end face placed so as to face the other end face of the first refractive index distribution type lens through the optical functional element, and a third port connected to the diagonally ground end face of the second refractive index distribution type lens, wherein an optical path length within the lens from the first port to the second port after reflection by the optical functional element, is equal to an optical path length within the lens from the first port to the third port after transmission through the optical functional element.

According the second aspect of the first aspect of the present invention, in the optical functional component, lengths and tilt angles of respective ground end faces of the first and second refractive index distribution type lenses are made equal to each other, and the positions of the shortest side edges of both refractive index distribution type lenses are arranged on the same side as the longest side edges of both refractive index distribution type lenses.

In order to solve the problems in the second aspect of the present invention, the third aspect of the present invention provides an optical multiplexer/demultiplexer, comprising first and second collimator lenses, an optical multiplexer/demultiplexer element inserted between end faces of the collimator lenses, first and second ports placed on an other end face of the first collimator lens, and a third port placed on an other end face of the second collimator lens, and which has two optical paths comprising, a first optical path from the first port to the second port after reflection by the optical multiplexer/demultiplexer element, and a second optical path from the first port to the third port after transmission through the optical multiplexer/demultiplexer element, and which combines and separates lights with different wavelengths using the two optical paths and the optical multiplexer/demultiplexer element, wherein there is provided a difference in optical path lengths between the first and second optical paths corresponding to a difference in focal lengths of lights with different wavelengths due to wavelength dispersion of the first and second collimator lenses.

The fourth aspects of the present invention in the second aspect of the present invention, in using such an optical multiplexer/demultiplexer according to the third aspect, it is desirable to use one in which the first and second collimator lenses are refractive index distribution type lenses, and the collimator lenses having respective end faces on the sides facing each of the ports ground diagonally, are placed such that the diagonally ground faces are parallel, and the optical path lengths of the first and second optical paths are different, and among the lights having different wavelengths, the light having a wavelength, whose focal length in the refractive index distribution type lens becomes longer, passes through the optical path of the two optical paths whose optical path length is longer.

Furthermore, in the second aspect of the present invention, the fifth aspect provides a optical multiplexer/demultiplexer, in which, among the first and second refractive index distribution lenses, it is preferable to use a refractive index distribution lens, in which the lengths of one of the first and second refractive index distribution type lenses are 0.23 to 0.25 times the pitch length of the wavelength with the longer focal length in the refractive index distribution type lens.

BEST MODE FOR CARRYING OUT THE INVENTION

Hereunder, a first aspect of the present invention is described in detail with reference to the attached drawings.

Figure 1:
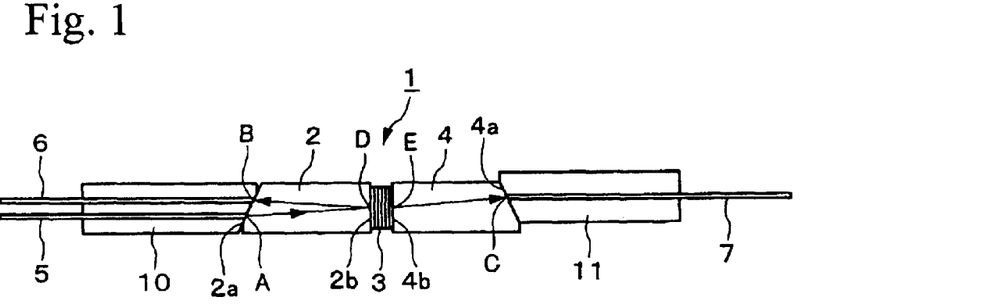
FIG. 1 is a schematic block diagram showing an example of an optical functional component of the present invention.

FIG. 1 shows an optical multiplexer/demultiplexer as a first embodiment of the present invention. In this figure, the optical multiplexer/demultiplexer 1 comprises a refractive index distribution type lens 2, a WDM optical multiplexer/demultiplexer filter 3 serving as an optical functional element, and a second refractive index distribution type lens 4, arranged in this order.

A first port 5 and a second port 6, which are formed by optical fibers, are both connected to an end face 2a of the first refractive index distribution type lens 2 on the opposite side from the optical multiplexer/demultiplexer filter 3. Furthermore, a third port 7 formed from an optical fiber is connected to an end face 4a of the second refractive index distribution type lens 4 on the opposite side from the optical multiplexer/demultiplexer filter 3.

In the embodiment shown in FIG. 1, the ports 5 through 7 are fixed into and supported by glass capillaries (capillary tubes) 10 and 11. However, the present invention is not limited to this, and a V groove substrate may be used as a device for supporting the ports 5, 6 and 7, and the optical fibers may be directly fusion spliced with the lenses 2 and 4.

The positional relationship between the first port 5 and the second port 6 is determined such that light incident from the first port 5 is output from the second port 6 when reflected from the optical multiplexer/demultiplexer filter 3. Furthermore, the positional relationship between the first port 5 and the third port 7 is determined such that light injected from the first port 5 is output from the third port 7 when transmitted through the optical multiplexer/demultiplexer filter 3.

The first and second refractive index distribution type lenses 2 and 4 are columnar lens having refractive index distribution in the radial direction, which is a type of lens also called a GRIN lens or a rod lens. For these refractive index distribution type lenses 2 and 4, a product called Selfoc (trade name of Nippon Sheet Glass Co., Ltd.) formed of a type of multi-component glass and refractive index distribution type lenses formed of silica glass as disclosed in Japanese Patent Application, First Publication No. 2001-104929, applied for by the present applicant, or the like, can be used, without specific limitation.

Figure 2:
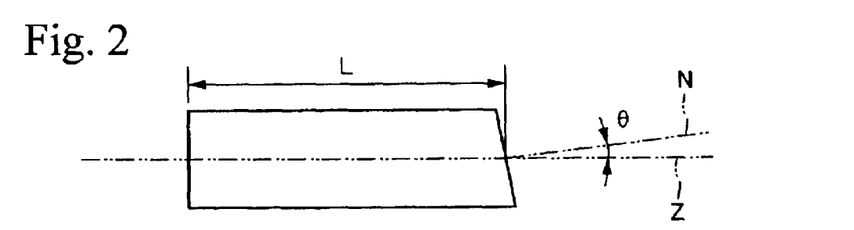
FIG. 2 is a perspective view for explaining the length and the tilt angle of a refractive index distribution type lens.

The first and second refractive index distribution type lenses 2 and 4, as shown in FIG. 2, are ground diagonally such that one end face is tilted at a predetermined angle to an optical axis Z. The other end face is ground perpendicular to the optical axis Z.

As shown in FIG. 2, in the present invention, the length of the refractive index distribution type lenses is the ratio of the length L of the optical axis and the pitch length, and the tilt angle of the end faces of the refractive index distribution type lenses, which are ground diagonally, is defined as the angle $\theta$ formed by a normal line N of the end face and the optical axis Z.

In the optical multiplexer/demultiplexer 1 of the present embodiment, the lengths and the tilt angles $\theta$, of the first and second refractive index distribution type lenses 2 and 4 are equal, the lens length being 0.23 to 0.25 pitch, and the tilt angle $\theta$ being 6 to 8°.

The optical multiplexer/demultiplexer filter 3 is a filter element, which is made of a multilayer dielectric, and has characteristics of reflecting light within one predetermined wavelength range, and transmitting light within another predetermined wavelength range. In general, a high refractive index element and a low refractive index element are selected from dielectrics such as $SiO_2$, $TiO_2$, $ZrO_2$, $Nb_2O_5$, $Ta_2O_5$ and the like as appropriate for use, and several to several hundreds of layers with a predetermined film thickness are laminated alternately.

Furthermore, in the optical multiplexer/demultiplexer 1 of the present embodiment, the positions of shortest side edges (the top edges in FIG. 1) and the longest side edge (the bottom edges in FIG. 1) of the first refractive index distribution type lenses 2 is arranged in the same side as the longest side edge of the second refractive index distribution type lenses 4.

Therefore, the optical path length within the lens from the optical multiplexer/demultiplexer filter 3 to the second port 6 (the optical path length between D and B in the figure), and the optical path length within the lens from the optical multiplexer/demultiplexer filter 3 to the third port 7 (the optical path length between E and C in the figure), are equal. Accordingly, the optical path length in the lens (optical path length AD+DB in FIG. 1) from the first port 5 to the second port 6 after reflection by the optical multiplexer/demultiplexer filter 3, is equal to the optical path length in the lens (optical path length AD+EC in FIG. 4) from the first port 5 to the third port 7 after transmission through the optical multiplexer/demultiplexer filter 3. Hence the focal lengths from the two lens faces, of the output light from the point B to the second port 6, and the output light from the point C to the third port 7 can be made equal.

Accordingly, it is possible to make the gap between the end faces of the respective ports 5, 6 and 7, and the end faces 2a and 4a of the refractive index distribution type lenses 2 and 4, extremely small, so that the alignment operation in the lens axial direction at the time of alignment fixing can be omitted, and hence, positioning time can be shortened. Furthermore, in the case of a structure in which adhesive is filled between the end faces, it is possible to reduce the film thickness of the adhesive, and hence the mechanical strength of the adhesive part is increased, and the adhesive thermal expansion or contraction reduced. Consequently, the performance of the optical multiplexer/demultiplexer 1 is not susceptible to changes with respect to change in ambient temperature, and stability is improved.

Next, a method of manufacturing the aforementioned optical multiplexer/demultiplexer 1 is described below. Note that the following procedure is just one example, and does not limit the present invention.

First, a first refractive index distribution type lens 2, an optical multiplexer/demultiplexer filter 3, and a second refractive index distribution type lens 4 are fixed in this order using an adhesive such as an epoxy system or the like. At this time, while observing with a CCD camera, the direction of the tilted faces of the end faces 2a and 4a of the first refractive index distribution type lens 2 and the second refractive index distribution type lens 4, the refractive index distribution type lenses 2 and 4 are rotated on a central optical axis to adjust their directions, such that the positions of the shortest side edges and the longest side edges of the lenses 2 and 4 are coincided.

Next, a first port 5 is fixed in a predetermined position on the end face 2a of the first refractive index distribution type lens 2 and adhered. Furthermore, the position of a second port 6 is determined and the second port 6 then glued. However at this time the second port 6 is offered to one end face 2a of the first refractive index distribution type lens 2 while light is injected from the first port 5, and aligned such that the intensity of the light output from the second port 6 is at a maximum, and the second port 6 is then glued in this position.

Similarly, the third port 7 is offered to one end face 4a of the second refractive index distribution type lens 4, at a distance the same as the distance between the end face 2a and the end face of the second port 6, while light is injected from the first port 5, and aligned such that the intensity of the light output from the third port 7 is at a maximum, and the third port 7 is then glued in this position.

By using such a procedure, it is possible to align the ports 5, 6 and 7 so as to minimize the insertion losses, so that it is possible to manufacture an optical multiplexer/demultiplexer 1 whose insertion losses are extremely small.

The present invention is described based on preferred embodiments as above. However, the present invention is not limited to these embodiments, and a range of modifications that do not depart from the gist of the present invention is possible.

For example, instead an optical multiplexer/demultiplexer filter 3 having wavelength dependency for the optical functional element, by using an optical multiplexer/demultiplexer filter which does not have wavelength dependency, then this can be applied to an optical branch coupler.

Figure 3:
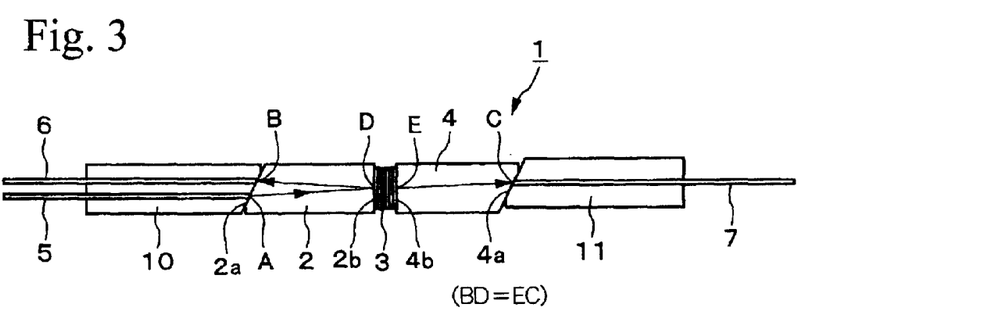
FIG. 3 is a schematic block diagram showing another example of an optical functional component of the present invention.

Moreover, as shown in FIG. 3, a configuration is also possible where the positions of the longest side edge of the first refractive index distribution type lens 2 and the shortest side edge of the second refractive index distribution type lens 4 are arranged on the same side, and the length of the second refractive index distribution type lens 4 is made shorter than the length of the first refractive index distribution type lens 2, so that the optical path length AD+DB and the optical path length AD+EC are equal.

As described above, according to the optical functional component of the first aspect of the present invention, since the optical path length from the one port on the first refractive index distribution type lens side to the other port through the optical functional element, is equal to the optical path length from the one port on the first refractive index distribution type lens side to the port on the second refractive index distribution type lens side via the optical functional element, alignment in the lens axial direction can be omitted, and the alignment operation can be performed in a short time, enabling lower cost. Moreover, in the case of a structure where adhesive is filled between the end faces, it is possible to reduce the gap between the end face of the optical fiber and the end face of the refractive index distribution type lens, and thus make the film thickness of the adhesive thinner, so that the mechanical strength of the adhesive part of the optical functional component is increased and stability with respect to temperature change improved.

Figure 4:
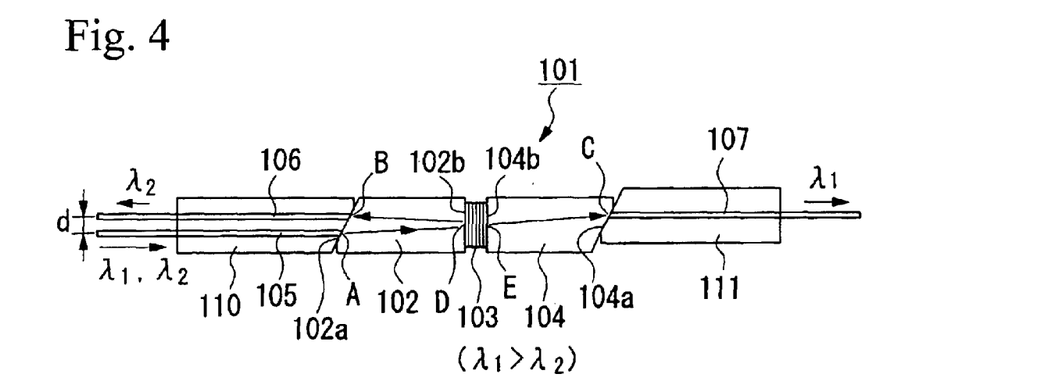
FIG. 4 is a schematic block diagram showing a first embodiment of an optical multiplexer/demultiplexer of the present invention.

FIG. 4 shows an optical multiplexer/demultiplexer according to the second aspect of the present invention. In this optical multiplexer/demultiplexer 101, refractive index distribution type lenses are used as collimator lenses 102 and 104, and the first refractive index distribution type lens 102, an optical multiplexer/demultiplexer element 103 and the second refractive index distribution type lens 4, are arranged in this order.

A first port 105 and a second port 106, which are formed from optical fibers, are both connected to an end face 102a of the first refractive index distribution type lens 102 on the opposite side from the optical multiplexer/demultiplexer element 103. Furthermore, a third port 107 formed from an optical fiber is connected to an end face 104a of the second refractive index distribution type lens 104 on the opposite side from the optical multiplexer/demultiplexer element 103.

In the embodiment shown in FIG. 4, the ports 105 through 107 are fixed into and supported by glass capillaries (capillary tubes) 110 and 111. However, the present invention is not limited to this, and a V groove substrate may be used as a device for supporting each of the ports 105 through 107, and the optical fibers may be directly fusion spliced with the lenses 102 and 104.

The positional relationship between the first port 105 and the second port 106 is determined such that light injected from the first port 105 is output from the second port 106 when reflected from the optical multiplexer/demultiplexer element 103. Furthermore, the positional relationship between the first port 105 and the third port 107 is determined such that light injected from the first port 105 is output from the third port 107 when transmitted through the optical multiplexer/demultiplexer element 103.

The first and second refractive index distribution type lenses 102 and 104 are columnar lens having refractive index distribution in the radial direction, which is a type of lens also called a GRIN or rod lens. For these refractive index distribution type lenses 2 and 4, as well as the product called Selfoc (trade name of Nippon Sheet Glass Co., Ltd.) formed from multi-component glass, refractive index distribution type lenses formed from silica glass as disclosed in Japanese Patent Application, First Publication No. 2001-104929, applied for by the present applicants, or the like, can be used, without specific limitation.

In general, with refractive index distribution type lenses, when the length is 0.25 pitch, parallel light converges at one point, and conversely light injected from one point is output as a parallel light. In the present embodiment, a length corresponding to 0.25 pitch is designated the focal length of a refractive index distribution type lens.

The first and second refractive index distribution type lenses 102 and 104, as shown in FIG. 4 and FIG. 2, are ground diagonally such that the end faces 102a and 104a on the sides facing the ports 105 through 107 are tilted at a predetermined angle to an optical axis Z.

In the second aspect of the present invention, the length of the refractive index distribution type lenses is the ratio of the length L of the optical axis and the pitch length, and the tilt angle of the end faces of the refractive index distribution type lenses, which are ground diagonally, is defined as the angle θ formed by a normal line N of the end face and the optical axis Z.

In the optical multiplexer/demultiplexer 1 of the present embodiment, the lengths and the tilt angles θ, of the first and second refractive index distribution type lenses 102 and 104 are equal, the lens length being 0.23 to 0.25 pitch, and the tilt angle θ being 6 to 8°.

The optical multiplexer/demultiplexer element 103 is a filter element, which is formed from a multilayer dielectric, and has characteristics of reflecting light within one predetermined wavelength range, and transmitting light within another predetermined wavelength range. In general, a high refractive index element and a low refractive index element are selected from dielectrics such as $Sio_2$, $TiO_2$, $ZrO_2$, $Ta_2O_5$, $Nb_2O_5$ and the like as appropriate for use, and several to several hundreds of layers with a predetermined film thickness are laminated alternately.

Furthermore, in the optical multiplexer/demultiplexer 101 of the present embodiment, the first and second refractive index distribution type lenses 102 and 104 are placed such that the end faces 102a and 104a, which are ground diagonally, are parallel as shown in FIG. 4. Moreover, the optical multiplexer/demultiplexer element 103 is a type that transmits a predetermined long wavelength element $\lambda_1$ and reflects a predetermined short wavelength element $\lambda_2$. The first and third ports 105 and 107 are placed on the long edge side of the refractive index distribution type lenses 102 and 104 respectively, and the second port 106 is placed on the short edge side of the first refractive index distribution type lens 102.

Accordingly, the optical path length (optical path length AD+DB in FIG. 4) of the first optical path in the lens from the first port 105 to the second port 106 after reflection by the optical multiplexer/demultiplexer element 103 is shorter than the optical path length (optical path length AD+EC in FIG. 1) of the second optical path in the lens from the first port 105 to the third port 107 after transmission through the optical multiplexer/demultiplexer element 3. If the distance between the cores of the optical fibers forming the first and second ports 105 and 106 is d, and the tilt angle of the diagonally ground end faces of the first and second refractive index distribution type lenses 102 and 104 is θ, the difference ΔL (equal to the difference between DB and EC) between the optical path length of the first optical path and the optical path length of the second optical path is represented by the following equation (1).

$$\Delta L = d \tan \theta \quad (1)$$

The optical multiplexer/demultiplexer of the present embodiment compensates for the difference in focal length between the refractive index distribution type lenses 102 and 104 by this optical path length difference ΔL.

Figure 5:
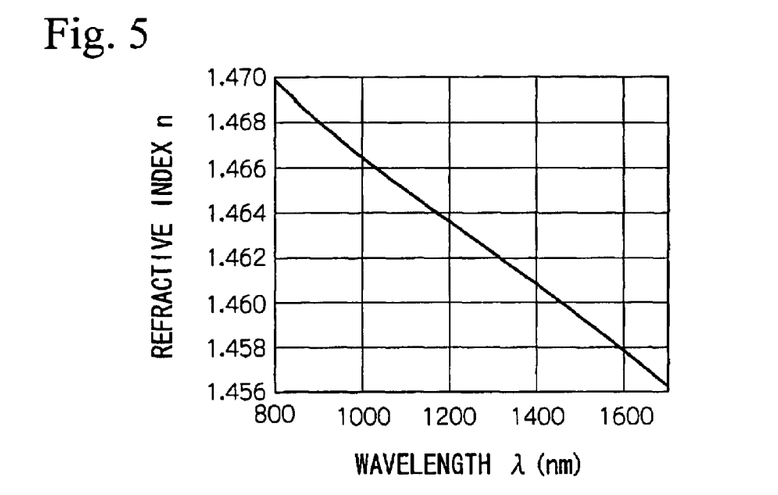
FIG. 5 is a graph showing an example of the wavelength dependency of the axial refractive index of a refractive index distribution type lens.
Figure 6:
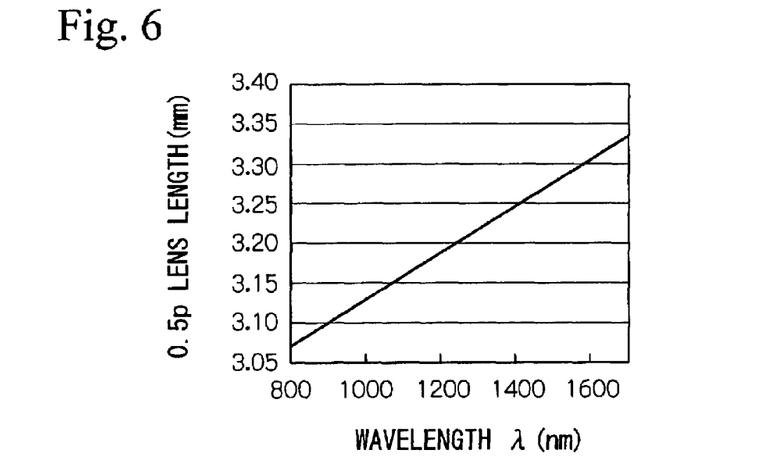
FIG. 6 is a graph showing an example of the wavelength dependency of a 0.5 pitch length for a refractive index distribution type lens.

FIG. 5 shows an example of wavelength dependency of the axial refractive index of a refractive index distribution type lens formed from glass whose principal element is quartz. Furthermore, FIG. 6 shows a change of the optimal path length (0.5 pitch, that is, twice the focal length) with wavelength dispersion.

If $\lambda_1$ is 1550 nm and $\lambda^2$ is 1480 nm, the length of a 0.5 pitch is approximately 3.29 mm for $\lambda_1$, and approximately 3.27 mm for $\lambda_2$, so the difference in optical path lengths due to wavelength dispersion is approximately 0.02 mm.

Therefore, in order to compensate for the difference in the focal lengths due to wavelength dispersion, ΔL is made to be approximately 20 μm. For example, if d=125 μm and θ=8°, then the equation (1) yields a value of ΔL=approximately 17.5 μm.

Accordingly, the optical path length (AD+DB) of the first optical path is approximately 0.5 pitch for the wavelength $\lambda_2$, so that a wavelength element $\lambda_2$ injected from the first port 105 is reflected by the optical multiplexer/demultiplexer element 103, and converges on the end face 102a of the first refractive index distribution type lens 102. Furthermore, since the optical path length (AD+EC) of the second optical path is approximately 0.5 pitch for the wavelength $\lambda_1$, a wavelength element $\lambda_1$ entering from the first port 105 is transmitted through the optical multiplexer/demultiplexer element 103, and converges on the end face 104a of the second refractive index distribution type lens 104.

Accordingly, it is possible to improve the coupling efficiency of the second port 106 and the first refractive index distribution type lens 102, and the third port 107 and the second refractive index distribution type lens 104, and to shorten the distance between the end faces of each of the collimator lenses and the ports, so that it is possible to reduce the deterioration of the optical losses. Furthermore, in a structure in which adhesive is filled between the end faces, it is possible to reduce the amount of adhesive used, and to make the film thickness of the adhesive thinner. Consequently, the mechanical strength of the adhesive part is increased, and stability with temperature change is improved.

Next, a method of manufacturing the optical multiplexer/demultiplexer 101 is described below. The following procedure is just one example, and does not limit the present invention.

First, refractive index distribution type lenses 102 and 104 having predetermined measurements and characteristics, and an optical multiplexer/demultiplexer element 103 are prepared, and the first refractive index distribution type lens 102, the optical multiplexer/demultiplexer element 103 and the second refractive index distribution type lens 4 are adhered in this order using an adhesive such as an epoxy system or the like. At this time, while observing with a CCD camera, the directions of the tilted faces of the end faces 102a and 104a of the first refractive index distribution type lens 102 and the second refractive index distribution type lens 104, the refractive index distribution type lenses 102 and 104 are rotated on a central optical axis to adjust their directions such that the end faces 102a and 104a are parallel.

Next, a first port 105 is fixed in a predetermined position on the end face 102a of the first refractive index distribution type lens 102 and adhered. Furthermore, the position of a second port 106 is determined and the second port 106 then adhered. However at this time the second port 106 is offered to one end face 102a of the first refractive index distribution type lens 2 while light is injected from the first port 105, and aligned such that the intensity of the light output from the second port 6 is at a maximum, and the second port 106 is then glued in this position.

Similarly, the third port 107 is offered to one end face 4a of the second refractive index distribution type lens 104 while light is injected from the first port 105, and aligned such that the intensity of the light output from the third port 107 is at a maximum, and the third port 107 is then glued in this position.

By using such a procedure, it is possible to align the ports 105, 106 and 107 so as to minimize the connection losses, so that it is possible to manufacture an optical multiplexer/demultiplexer 1 whose connection losses are extremely small.

Figure 7:
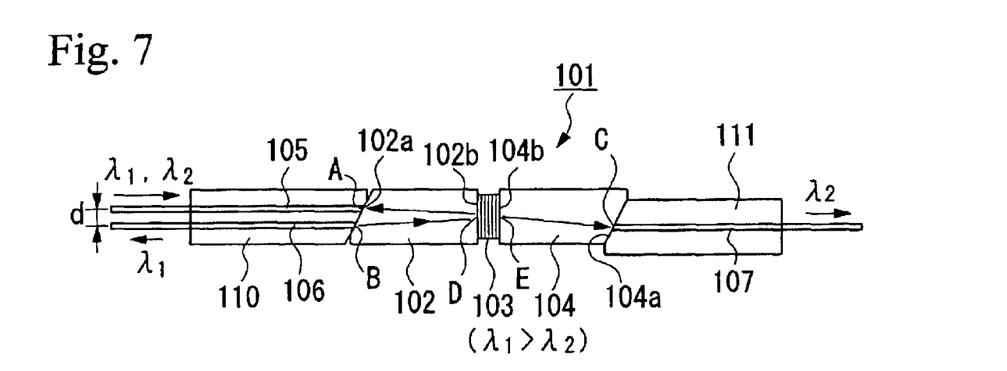
FIG. 7 is a schematic block diagram showing a second embodiment of an optical multiplexer/demultiplexer of the present invention.

FIG. 7 shows an optical multiplexer/demultiplexer of a second embodiment. This optical multiplexer/demultiplexer 101 differs from the optical multiplexer/demultiplexer of the first embodiment in that it uses an optical multiplexer/demultiplexer element 103 that reflects a long wavelength element $\lambda_1$, and transmits a short wavelength element $\lambda_2$. Furthermore, a third port 107 on the transmission side is placed on the short edge side of a second refractive index distribution type lens 104.

This enables the long wavelength element $\lambda_1$ to pass through a first optical path (optical path length AD+DB in FIG. 7) from the first port 105 to the second port 106 after reflection by the optical multiplexer/demultiplexer element 103, the short wavelength element $\lambda_2$ to pass through a second optical path (optical path length AD+EC in FIG. 7) from the first port 105 to the third port 107 after transmission through the optical multiplexer/demultiplexer element 103, and also the optical path length AD+DB to be made longer than the optical path length AD+EC.

As shown in FIG. 7, since the focal length of the long wavelength element $\lambda_1$ is longer than that of the short wavelength element $\lambda_2$, by using the same method as the optical multiplexer/demultiplexer 1 of the first embodiment, it is possible to improve the coupling efficiency between the refractive index distribution type lenses 102 and 104 and the ports 105 through 107, and reduce losses.

Furthermore, as described in the first embodiment of the second aspect of the present invention, by appropriately designing the distance d between the cores of the first and second ports 105 and 106 and the tilt angle θ of the end face 102a of the first refractive index distribution type lens 102, which is ground diagonally, it is possible to make the optical path lengths (AD+DB and AD+EC) of the first and second optical paths approximately 0.5 pitch for wavelengths $\lambda_1$ and $\lambda_2$ light passing through each of the optical paths.

This enables the gap between the end faces of the refractive index distribution type lenses 102 and 104 and the ports 105 through 107 to be made smaller, the amount of adhesive used to be reduced, and the thickness of the adhesive to be made thinner. Consequently, the mechanical strength of the adhesive part is increased, and stability with temperature change is improved.

Figure 8A:
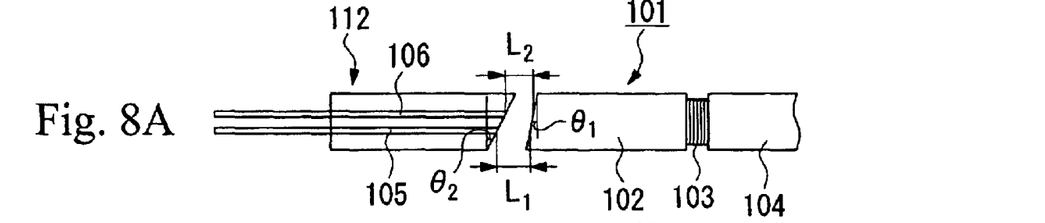
FIGS. 8A and 8B are schematic block diagrams showing a third embodiment of an optical multiplexer/demultiplexer of the present invention.
Figure 8B:
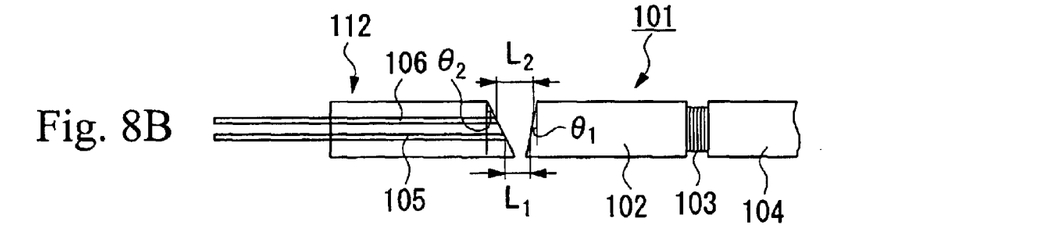

FIG. 8 shows the main parts of an optical multiplexer/demultiplexer of a third embodiment of the second aspect of the present invention. In an optical multiplexer/demultiplexer 101 as shown in the figure, a dual fiber pigtail 112 is used for the first and second ports 105 and 106. The end face of this dual fiber pigtail 112 is ground diagonally with a tilt angle to the optical axis of $\theta_2$. This tilt angle $\theta_2$ has a predetermined difference from a tilt angle $\theta_1$ of the diagonally ground end face of the first refractive index distribution type lens 102.

A third port (not shown in FIG. 8) is placed on the opposite side of the second refractive index distribution type lens 104 from the optical multiplexer/demultiplexer element 103.

In this case, the gap between the end faces of the first port 105 and the first refractive index distribution type lens 102 is $L_1$, and the gap between the end faces of the second port 106 and the first refractive index distribution type lens 102 is $L_2$. Since $\theta_1 \neq \theta_2$, then $L_1 \neq L_2$. Consequently, the difference between $L_1$ and $L_2$ is the optical path length difference $\Delta L$.

According to the present embodiment in the second aspect of the present invention, even if lenses of the same length are used for the first and second refractive index distribution type lenses 102 and 104, it is possible to provide an optical path length difference $\Delta L$ between the first optical path from the first port 105 to the second port 106 after reflection by the optical multiplexer/demultiplexer element 103, and the second optical path from the first port 105 to the third port (not shown in the figure) after transmission through the optical multiplexer/demultiplexer element 103, by the difference between the tilt angles $\theta_1$ and $\theta_2$.

Accordingly, by adjusting $\theta_1$ and $\theta_2$ appropriately to provide the required optical path length difference $\Delta L$, it is possible to compensate for the difference in focal lengths due to wavelength dispersion in refractive index distribution type lenses. Accordingly, it is possible to improve the coupling efficiency of the lenses and the ports, thus enabling losses of the optical multiplexer/demultiplexer 1 to be reduced.

Figure 9:
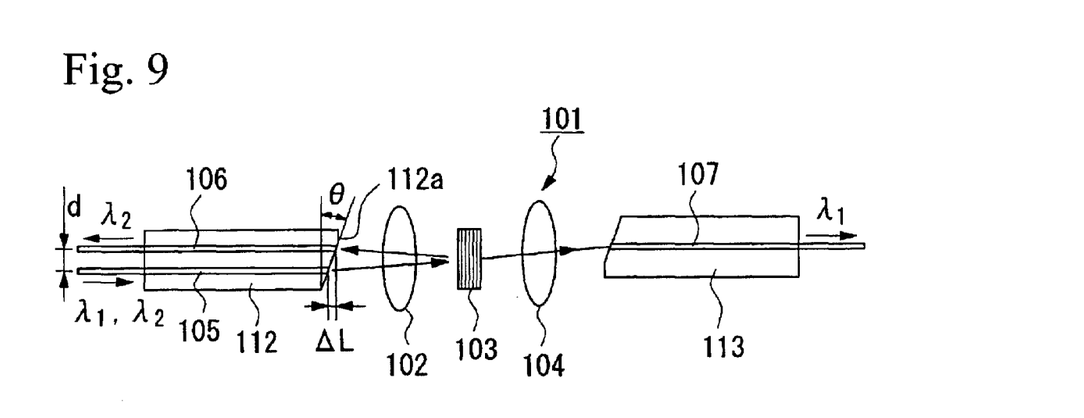
FIG. 9 is a schematic block diagram showing a fourth embodiment of an optical multiplexer/demultiplexer of the present invention.

FIG. 9 is a schematic structural diagram showing an optical multiplexer/demultiplexer of a fourth embodiment of the second aspect of the present invention. In this optical multiplexer/demultiplexer 1, aspherical lenses are used for collimator lenses 102 and 104. An optical multiplexer/demultiplexer element 103 is placed between the end faces of the collimator lenses 102 and 104. A dual fiber pigtail 112 comprising first and second ports 105 and 106 is placed on the other end face side of the first collimator lens 102. Furthermore, a single fiber pigtail 113 comprising a third port 107 is placed on the other end face side of the second collimator lens 104.

In FIG. 9, a structure is shown in which aspherical lenses are used as the first and second collimator lenses 101 and 102. However, as an alternative, ball lenses, spherical lenses or the like can be used.

In such an optical multiplexer/demultiplexer 101, lights $\lambda_1$ and $\lambda_2$ with different wavelengths are injected from the first port 105, while only demultiplexed light $\lambda_2$ is output from the second port 106. The focal length of the collimator lens 102 differs between light with wavelength $\lambda_1$ and light with wavelength $\lambda_2$ due to wavelength dispersion of the collimator lens 102. If the difference in focal lengths is not compensated, losses of reflected light increase.

Therefore, in the present embodiment, an end face 112a of the dual fiber pigtail 112 facing the first collimator lens 102 is ground diagonally. At this time, a distance $\Delta L$ in the optical axis direction from the front end of the first port 105 to the front end of the second port 106 is represented by the following equation (2), where the tilt angle of the end face 112a of the dual fiber pigtail 112 is θ, and the distance between the core of the first port 105 and the core of the second port 106 is d.

$$\Delta L = d \tan \theta \qquad (2)$$

Therefore, by setting the tilt angle θ and sizing the distance d between the cores appropriately such that $\Delta L$ equals the difference between the focal lengths, aligning the first and second ports 105 and 106 becomes easy, and losses can be reduced.

It is possible to align the first and second ports 105 and 106 by the following procedure for example. Firstly, the first port 105 is connected to a light source, and the second port 6 to an output monitor. While an input light from this light source is output from the first port 105, the first port 105 is offered to the first collimator lens 102. At this time, the dual fiber pigtail 112 is moved, and when the location is found at which the light reflected from the optical multiplexer/demultiplexer element 103 is input to the second port 106 with the highest intensity, it is fitted in this location. By aligning in this manner, it is possible to manufacture an optical multiplexer/demultiplexer 101 in which losses of reflected light are extremely low.

The second aspect of the present invention is described based on preferred embodiments as shown above. However, the present invention is not limited to these embodiments, and a range of modifications that do not depart from the gist of the present invention is possible.

For example, in the above embodiments, a reversible optical multiplexer/demultiplexer element is described, but a structure in which an optical multiplexer or an optical demultiplexer is formed by using an element having only one of the functions of multiplexing and demultiplexing without being reversible is also possible.

Furthermore, instead of using the dual fiber pigtail 112, it is possible to use two single fiber pigtails for the first and second ports 105 and 106. As a result, it is possible to align the locations of the end faces of each of the single fiber pigtails individually.

EXAMPLES

In the optical multiplexer/demultiplexer 101 as shown in FIG. 4, the transmission wavelength $\lambda_1$ of the optical multiplexer/demultiplexer element 103 was set at 1550 nm, and the reflection wavelength $\lambda_2$ was set at 1480 nm. Furthermore, the length of the refractive index distribution type lenses 102 and 104 was made to be 0.25 pitch, and the tilt angle θ of the diagonal end face was made to be 8°. The distance d between the cores of first and second ports 105 and 106 was 125 μm.

The optical path length difference ΔL between the first and second optical paths was 17.5 μm from equation (1). Moreover, the difference in focal lengths $\lambda_1$ and $\lambda_2$ of the refractive index distribution type lenses 102 and 104 used here was approximately 20 μm.

The loss of the reflected light obtained from the ratio of the intensity of wavelength 1480 nm transmitted through the first port 105 and the intensity of wavelength 1480 nm output to the third port 107 was 0.09 dB.

The loss of the transmitted light obtained by comparing the intensity of wavelength 1550 nm transmitted through the first port 105 with the intensity of wavelength 1550 nm output to the third port 107 was 0.15 dB.

As above, it was possible to make the losses of both the reflected light and transmitted light extremely small.

As described above, according to an optical multiplexer/demultiplexer of the second aspect of the present invention, the difference between the optical path length of the first optical path from the first port to the second port after reflection by the optical multiplexer/demultiplexer element, and the optical path length of the second optical path from the first port to the third port after transmission through the optical multiplexer/demultiplexer element, is used to compensate for the difference in focal lengths between lights with different wavelengths, which pass through each of the optical paths, so that it is possible to improve the coupling efficiency between the ports and the collimator lenses, and to reduce the losses of the optical multiplexer/demultiplexer.

INDUSTRIAL APPLICABILITY

The first and second aspects of the present invention provide structures and manufacturing methods of optical multiplexer and optical demultiplexer elements used for various optical applications such as optical communication system.

What is claimed is:

1. An optical device comprising:
   a first refractive index distribution type lens having a first end face and second end face, said first end face being ground diagonally;
   first and second ports connected to the first end face of said first refractive index distribution type lens;
   an optical functional element connected to the second end face of said first refractive index distribution type lens;
   a second refractive index distribution type lens having a third end face and a fourth end face, the fourth end face being ground diagonally and the third end face being placed so as to face the second end face of said first refractive index distribution type lens via said optical functional element, and
   a third port connected to the fourth end face of said second refractive index distribution type lens, wherein
   an optical path length from said first port to said second port after reflection by said optical functional element for an optical path length of reflected light through the first refractive index distribution type lens is equal to an optical path length from said first port to said third port through said optical functional element for an optical path of a transmitted light through the second refractive index distribution type lens.

2. The optical device according to claim 1, wherein a length along a center axis of said first refractive index distribution lens is equal to a length along a center axis of said second refractive index distribution type lens.

3. The optical device according to claim 1, wherein a tilt angle of said first end face is equal to a tilt angle of said fourth end face.

4. The optical device according to claim 1, wherein a length along a center axis of said first refractive index distribution type lens having the first and second end faces is equal to a length along a center axis of the second refractive index distribution type lens having the third and fourth end faces and a tilt angle of the first end face is equal to a tilt angle of said fourth end face, wherein each of the first and second refractive distribution type lenses has a shortest side edge and a longest side edge, and
   positions of the shortest side edges of the first and second refractive index distribution type lenses and positions of the longest side edges of the first and second refractive index distribution type lenses are arranged respectively on the same side of the optical device.

5. An optical multiplexer/demultiplexer comprising:
   a first collimator lens having a first end face and a second end face;
   a second collimator lens having a third end face and a fourth end face;
   an optical multiplexer/demultiplexer element inserted between said second face and said third end face;
   first and second ports arranged with respect to said first end face of said first collimator lens; and
   a third port arranged with respect to said fourth end face of said second collimator lens, wherein
   a first optical path is from said first port to said second port after reflection by said optical multiplexer/demultiplexer element,
   a second optical path is from said first port to said third port after transmission through said optical multiplexer/demultiplexer element,
   lights with different wavelengths are combined and separated via said first and second optical paths and said optical multiplexer/demultiplexer element, and
   said first optical path length of light reflected by the multiplexer/demultiplexer element through the first collimator type lens is different from said second optical path length of transmitted light through the first collimator lens, through the multiplexer/demultiplexer element, and through the second collimator lens, corresponding to a difference in focal lengths due to dispersion of light with different wavelengths, reflective wavelengths relative to transmitted wavelengths, in the first and second collimator lenses.

6. The optical multiplexer/demultiplexer according to claim 5, wherein said first and second collimator lenses are refractive index distribution type lenses.

7. The optical multiplexer/demultiplexer according to claim 6, wherein said first end face is placed to face diagonally ground faces of said first and second ports and the fourth end face is placed to face a diagonally ground face of said third port, said first and fourth diagonally ground faces are arranged to be parallel to each other and the optical path length of said first and second optical paths are different.

8. The optical multiplexer/demultiplexer according to claim 7, wherein said first and second collimator lenses are refractive index distribution type lenses, said first collimator lens has the diagonally ground first end face, which faces the diagonally ground faces of the first and second ports, and the second collimator lens has the diagonally ground fourth end face, which faces the diagonally ground end face of the third port; and said first and second collimator lenses are placed such that the diagonally ground first and fourth end faces are parallel, and the optical path lengths of said first and second optical paths are different, and among said lights of different wavelengths, the light of the wavelength whose focal length in a refractive index distribution type lens is longer passes through the longer of said first and second optical paths.

9. The optical multiplexer/demultiplexer according to claim 8, wherein the lengths of said first and second refractive index distribution type lenses are 0.23 to 0.25 times the pitch length of said wavelength with the longer focal length in said refractive index distribution type lens.

10. The optical multiplexer/demultiplexer according to claim 5, wherein said first and second ports are respective optical fibers of a dual fiber pigtail, and an end face of said dual fiber pigtail on a side facing said first side of said first collimator lens is ground diagonally with a predetermined tilt angle, and said third port is an optical fiber of a dual fiber pigtail, and an end face of said dual fiber pigtail facing said fourth side of said second collimator lens is ground diagonally with a predetermined tilt angle.

11. The optical multiplexer/demultiplexer according to claim 5, wherein said first and second collimator lenses are any one of aspherical lenses, ball lenses and spherical lenses.

* * * * *